United States Patent [19]

Phillips et al.

[11] 4,213,899
[45] Jul. 22, 1980

[54] REACTIVE DYESTUFFS CONTAINING CHLORINE OR FLUORINE SUBSTITUENTS AND ONE OR MORE PYRIDINE RADICALS LINKED TO THE DYESTUFF AT THE 2-, 4- OR 6-POSITION

[75] Inventors: Duncan A. S. Phillips; Brian Anderson; Neville Jackson; Cecil V. Stead; Alan T. Costello, all of Manchester, England

[73] Assignee: Imperial Chemical Industries Limited, London, United Kingdom

[21] Appl. No.: 886,127

[22] Filed: Mar. 13, 1978

[30] Foreign Application Priority Data

May 27, 1977 [GB] United Kingdom ............... 22471/77

[51] Int. Cl.² ............. C09B 62/36; C09B 62/38; C09B 62/40; C09B 62/42
[52] U.S. Cl. .............. 260/156; 260/146 R; 544/75; 544/76; 544/348; 546/2; 546/6; 546/56; 546/285; 546/286; 546/287; 546/289; 546/293; 546/297; 546/298; 546/301; 546/304; 546/310; 546/329; 546/345
[58] Field of Search ............... 260/156, 146 R, 270 P, 260/270 R, 272, 278, 294.9, 295 R, 295 N, 295 AM, 250 BC; 544/75, 76, 348; 546/2, 6, 56, 285, 286, 287, 289, 293, 297, 298, 301, 304, 310, 329, 345

[56] References Cited

U.S. PATENT DOCUMENTS

| | | | |
|---|---|---|---|
| 3,915,951 | 10/1975 | Agback et al. | 260/156 |
| 3,980,659 | 9/1976 | Fleckenstein et al. | 260/156 X |

FOREIGN PATENT DOCUMENTS 1122389 8/1968 United Kingdom ............... 260/156

*Primary Examiner*—Floyd D. Higel
*Attorney, Agent, or Firm*—Cushman, Darby & Cushman

[57] ABSTRACT

A dyestuff of the formula

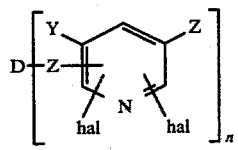

where
D is a chromophoric residue
n is 1 or 2
Z is

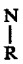

where R is H, $C_{1-4}$alkyl, $C_{1-4}$alkyl substituted by OH, $OSO_3H$, CN or $SO_3H$ or is phenyl
each hal independently represents a chlorine or fluorine atom occupying one of the remaining 2-, 4- and 6-positions of the pyridine nucleus
X is F, Cl, CN or $NO_2$
Y is H, F, Cl, CN or $NO_2$.

These dyestuffs reactively dye cellulose at low temperatures and are less prone to "acid bleeding" than some known reactive dyes.

6 Claims, No Drawings

REACTIVE DYESTUFFS CONTAINING CHLORINE OR FLUORINE SUBSTITUENTS AND ONE OR MORE PYRIDINE RADICALS LINKED TO THE DYESTUFF AT THE 2-, 4- OR 6-POSITION

This invention relates to reactive dyes in particular to dyes containing one or more halogeno-pyridine residues.

It is well known to produce dyestuffs containing groups which are reactive to substrates containing active hydrogen atoms e.g. in the form of hydroxyl groups such as cellulose. These so called reactive dyes form a covalent bond with the substrate when applied under alkaline conditions. Generally these dyes are associated with extremely good fastness in respect to washing. The temperature at which a reactive dye fixes to a substrate is controlled by the reactivity of the reactive group present. In some cases fixation may be achieved at low temperatures e.g. room temperatures to 40° C. thus giving the advantage of simple, cheap processing. However some such low temperature fixing dyes containing azo chromophores show the disadvantage of forming loose dye when subjected to moist acidic conditions. This effect is known as "acid-bleeding" and can manifest itself as loss of colour and staining of adjacent materials.

We have now discovered a novel halopyridinyl reactive group which when present in dyestuffs often confers an improved balance of properties especially an improved combination of low temperature fixing characteristics and resistance to acid bleeding.

According to the present invention there are provided dyestuffs containing one or more pyridine radicals linked to the dyestuff at the 2-, 4- or 6-position, with halogen substituents in both of the remaining two of these positions and an electron attracting substituent in one of the 3- or 5-positions.

The halogen substituents may be different but it is usually preferred that they are the same. The preferred halogens are chlorine and more especially fluorine.

There may be electron attracting substituents in both of the 3- and 5-positions and these may be the same or different.

As electron attracting substituents there may be mentioned halogens especially F and Cl, CN, $NO_2$, $SO_3H$, $CO_2R^1$ and $CONR^1,R^{11}$ where $R^1$ and $R^{11}$ are each independently H, optionally substituted alkyl such as β-hydroxyethyl and benzyl or optionally substituted aryl such as carboxy- and sulphophenyl.

A preferred class of dyestuffs of the present invention may be represented by the formula:

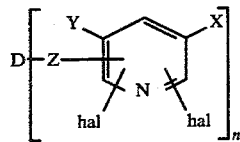

(1)

where
D is a chromophoric residue,
n is a positive integer,
Z is O, S or

linked to the 2-, 4- or 6-position of the pyridine nucleus, R is H, optionally substituted alkyl or optionally substituted aryl,
each hal independently represents a halogen atom occupying one of the remaining 2-, 4- and 6-positions of the pyridine nucleus,
X is an electron-attracting substituent and
Y is H or an electron-attracting substituent which may or may not be the same as X.

It is usually preferred that the dyestuff contains sufficient substituents such as $SO_3H$ to give it significant water-solubility, e.g. at least 5 grams per liter.

A particularly preferred class of dyestuffs of formula (1) are those in which
n=1 or 2,
Z is

where R is $C_{1-4}$alkyl or $C_{1-4}$alkyl substituted by OH, $OSO_3H$, CN or $SO_3H$; or phenyl or especially H,
both hal are Cl or especially F,
X is an electron attracting substituent especially F, Cl or CN, and Y is an electron attracting substituent of the types preferred for X.

The symbol D may represent a chromophoric residue of any of the dyestuff series, e.g. of the azo, anthraquinone, phthalocyanine, formazan, nitroarylamine, oxazine, azine, triphenylmethane or xanthene series. The group Z linking the pyridine nucleus to D is itself preferably attached to a carbon atom in D which may be part of an aromatic radical but it is usually preferred that Z is attached to a carbon atom not being part of a structure having aromatic character, e.g. Z is attached to a non-conjugated aliphatic or cycloaliphatic carbon atom.

Thus an especially preferred class of dyes are those represented by the formula (1) in which the chromophoric residue D is capable of being represented in the form $D^1$—W— where $D^1$ is a chromophoric residue linked at an aromatic carbon atom and W is a non-conjugated aliphatic or cycloaliphatic group linked to Z by a carbon atom of the form —$CHR^2$— where $R^2$ is lower alkyl or more especially H.

Preferred forms of W are represented by the formula Q—$W^1$ where $W^1$ is an alkylene chain of 1 to 6 carbon atoms optionally interrupted by O or S and Q is a direct link, O, CO, $SO_2$, $CONR^3$, $NR^3CO$, $SO_2NR^3$, $NR^3SO_2$ or $N(COR^3)$ where $R^3$ is $C_{1-4}$alkyl or H.

The group Q—$W^1$ is attached to $D^1$ via Q. It is usually preferred that $W^1$ is $CH_2$ or $CH_2CH_2$ and that Q is a direct link or $NR^3CO$.

As examples of W there may be mentioned:
$CH_2$
$CH_2CH_2$
$CH_2CH_2OCH_2CH_2$
$NH.COCH_2CH_2$
$N(COCH_3)CH_2CH_2$
$NCH_3.COCH_2CH_2$

NHSO₂CH₂CH₂
CONHCH₂
SO₂NHCH₂CH₂
OCH₂CH₂
SO₂CH₂CH₂
COCH₂CH₂

The present invention further provides a process for the manufacture of dyes of formula (1) which comprises reacting a chromophoric compound containing n groups of the formula OH, SH or

with n moles of a compound of the formula:

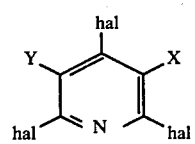   (2)

wherein n, R, X, Y and hal have the meanings given above.

The above reaction may conveniently be carried out in aqueous medium optionally containing water miscible organic solvent at, for example, a temperature of 0° C. to 80° C. maintaining the pH at from 3 to 12, by the addition of an acid binding agent such as sodium carbonate bicarbonate or hydroxide.

The reactive dyestuff prepared in the process of the invention may be isolated by any convenient known method such as spray drying or precipitation and filtration. The aqueous reaction mixture containing the dyestuff of formula (1) may, in some instances, be conveniently employed in preparing, for example, dyeing liquors without isolation of the solid dyestuff. When, as is often the case, the dyestuff contains acidic solubilising groups such as SO₃H it is usually convenient to isolate the dyestuff with these groups, at least partially, in the form of salts e.g. sodium salts.

As examples of chromophoric compounds containing n groups of the formula:

which may be used in the process of the invention there may be mentioned coloured compounds of the following classes:

(1) Anthraquinone compounds of the formula:

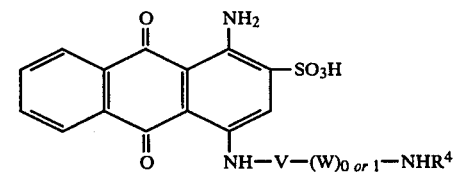   (3)

wherein the anthraquinone nucleus may contain an additional sulphonic acid group in the 5-, 6-, 7- or 8-position and V represents a bridging group which is preferably a divalent radical of the benzene series, for example phenylene, diphenylene or 4,4'-divalent stilbene or azobenzene radicals, W has the meaning given above and $R^4$ is H or $C_1$-$C_4$ alkyl. It is preferred that V should contain one sulphonic acid group for each benzene ring present.

(ii) Monoazo compounds of the formula:

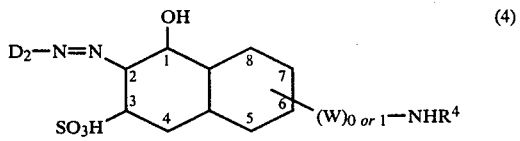   (4)

wherein $D_2$ represents a mono- or di-cyclic aryl radical which is free from azo groups and $NHR^4$ groups, the $(W)_{0\ or\ 1}NHR^4$ group is preferably attached to the 6-, 7- or 8-position of the naphthalene nucleus, and which may contain a sulphonic acid group in the 5- or 6-position of the naphthalene nucleus.

$D_2$ may represent a radical of the naphthalene or benzene series which is free from azo substituents, for example, a stilbene, diphenyl, benzthiazolyl/phenyl or diphenylamine radical. Also in this class are to be considered the related dyestuffs in which the $NHR^4$ group, instead of being attached to the naphthalene nucleus, is attached to a benzoylamino or anilino group which is attached to the 6-, 7- or 8-position of the naphthalene nucleus.

Particularly valuable dyestuffs are obtained from those wherein $D_2$ represents a sulphonated phenyl or naphthyl radical, especially those which contain a —SO₃H group in ortho position to the azo link; the phenyl radical may be further substituted for example by halogen atoms such as chlorine, alkyl radicals such as methyl, acylamino groups such as acetylamino and alkoxy radicals such as methoxy.

(iii) Disazo compounds of formula (4), wherein $D_2$ stands for a radical of the azobenzene, azonaphthalene or phenylazonaphthalene series and the naphthalene nucleus is substituted by the $NHR^4$ group, and optionally by sulphonic acid as in class (ii).

(iv) Mono- or dis-azo compounds of the formula:

   (5)

wherein $D_2$ stands for a radical as defined for class (ii) or class (iii) and $D_3$ is a 1:4-phenylene or a sulpho-1:4-naphthylene or a stilbene radical; the benzene nuclei in $D_2$ and $D_3$ may contain further substituents such as halogen atoms, or alkyl, alkoxy, carboxylic acid and acylamino groups.

(v) Mono- or dis-azo compounds of the formula:

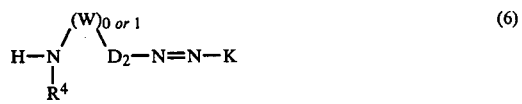   (6)

wherein $D_2$ represents an arylene radical such as a radical of the azobenzene, azonaphthalene or phenylazonaphthalene series, or, preferably, an at most dicyclic arylene radical of the benzene or naphthalene series, and K represents the radical of a naphthol sulphonic acid or the radical of an enolised or enolisable ketomethylene compound (such as an acetoacetarylide, 5-pyrazolone or 6-hydroxypyrid-2-one) having the OH group ortho to the azo group. $D_2$ preferably represents a radical of the benzene series containing a sulphonic acid group.

(vi) Mono- or dis-azo compounds of the formula:

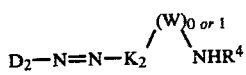 (7)

wherein $D_2$ represents a radical of the types defined for $D_2$ in classes (ii) and (iii) above and $K_2$ represents the radical of an enolisable ketomethylene compound (such as an acetoacetarylide or a 5-pyrazolone) having the OH group in α-position to the azo group.

(vii) 1:1-metal complex, especially the copper complex, compounds of those dyes of formulae 4,6 and 7 (wherein $D_2$, K and $K_2$ have all the respective meanings stated) which contain a metallisable (for example a hydroxy, lower alkoxy or carboxylic acid) group ortho to the azo group in $D_2$.

(viii) Phthalocyanine compounds of the formula:

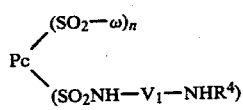 (8)

wherein Pc represents the phthalocyanine nucleus preferably of copper phthalocyanine, ω represents a hydroxy and/or a substituted or unsubstituted amino group, $V_1$ represents a bridging group, preferably an aliphatic, cycloaliphatic or aromatic bridging group, n represents 1, 2 or 3.

(ix) Nitro dyestuffs of the formula:

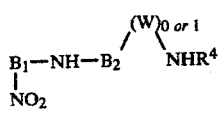 (9)

wherein $B_1$ and $B_2$ represents monocyclic aryl nuclei, the nitro group in $B_1$ being ortho to the NH group.

(x) Formazan dyestuffs of the formula:

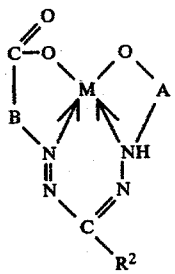 (10)

wherein M is Cu or Ni, A and B are mono or polynuclear aryl groups in which the links shown are from carbon atoms ortho to each other, the group $R^2$ is an optionally substituted hydrocarbyl group and one of the groups A, B or $R^2$ bears a group $$-\underset{R^4}{N}-H \text{ or } -W-\underset{R^4}{N}H$$

(xi) Nitro-stilbene dyestuffs of the formula:

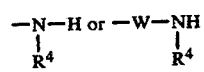 (11)

wherein n and m are each independently 1 or 2.

(xii) Triphenodioxazine dyes of the formula:

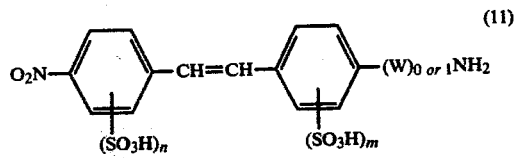 (12)

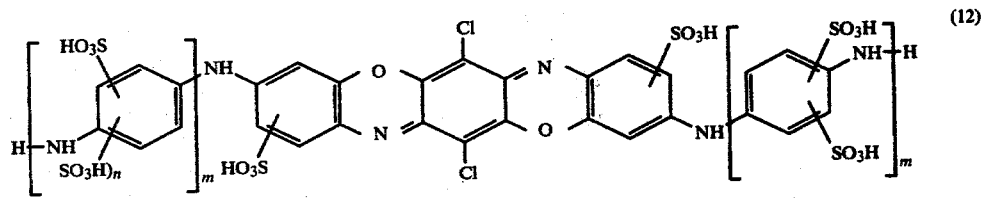

in which m=0 or 1 and n=0 or 1.

or

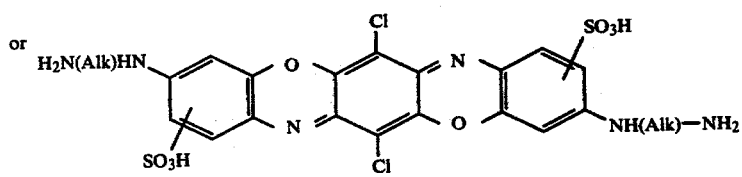

where Alk = an alkylene group preferably of 2–6 carbon atoms.

(xiii) Phenazine dyes of the formula:

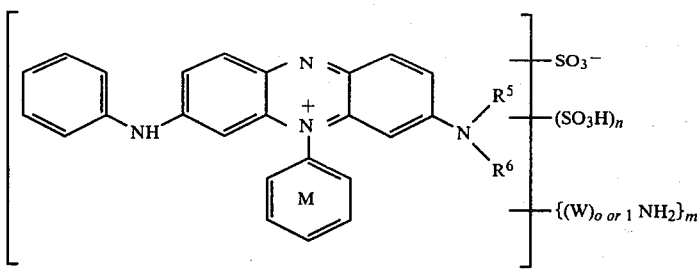

wherein
n is 1 or 2 and m is 1 or 2
$R^5$ is H or optionally substituted $C_1-C_4$ alkyl
$R^6$ is optionally substituted $C_1-C_4$ alkyl, optionally substituted aralkyl or optionally substituted aryl, and the benzene ring $A_1$ can be further substituted e.g. by Cl, $CH_3$ or $OCH_3$.

As particular examples of compounds of classes (i) to (xiii), there may be mentioned:

In Class (i)
1-amino-4-(4'-aminoanilino)anthraquinone-2,2'-disulphonic acid
1-amino-4-(4'-methylaminoanilino)anthraquinone-2:3'-disulphonic acid.
1-amino-4-(3'-amino-2':4':6'-trimethylaminoanilino)anthraquinone-2.5-disulphonic acid
1-amino-4-(4'-aminoacetylaminoanilino)anthraquinone-2,2'-disulphonic acid.

In Class (ii)
6-amino-1-hydroxy-2-(2'-sulphophenylazo)naphthalene-3-sulphonic acid
8-amino-1-hydroxy-2-(2'-sulphophenylazo)naphthalene-3:6-sulphonic acid
7-amino-2-(2':5'-disulphophenylazo)-1-hydroxynaphthalene-3-sulphonic acid
7-methylamino-2-(2'-sulphophenylazo)-1-hydroxynaphthalene-3-sulphonic acid
7-methylamino-2-(4'-methoxy-2'-sulphophenylazo)-1-hydroxynaphthalene-3-sulphonic acid
8-(3'-aminobenzoylamino)-1-hydroxy-2-(2'-sulphophenylazo)naphthalene-3:6-disulphonic acid
8-amino-1-hydroxy-2:2'-azonaphthalene-1':3:5':6-tetrasulphonic acid
6-amino-1-hydroxy-2-(4'-acetylamino-2'-sulphophenylazo)naphthalene-3-sulphonic acid
6-methylamino-1-hydroxy-2-(4'-methoxy-2'-sulphophenylazo)naphthalene-3-sulphonic acid
8-amino-1-hydroxy-2-phenylazonaphthalene-3:6-disulphonic acid
8-amino-1-hydroxy-2:2'-azonaphthalene-1':3:6-trisulphonic acid
6-amino-1-hydroxy-2-(4'-methoxy-2'-sulphophenylazo)-naphthalene-3-sulphonic acid
8-amino-1-hydroxy-2:2'-azonaphthalene-1':3:5'-trisulphonic acid
6-amino-1-hydroxy-2:2'-azonaphthalene-1',3,5'-trisulphonic acid
6-methylamino-1-hydroxy-2:2'-azonaphthalene-1':3:5'-trisulphonic acid
7-amino-1-hydroxy-2:2'-azonaphthalene-1':3-disulphonic acid
8-amino-1-hydroxy-2-(4'-hydroxy-3'-carboxyphenylazo)naphthalene-3:6-disulphonic acid
6-amino-1-hydroxy-2-(4'-hydroxy-3'-carboxyphenylazo)naphthalene-3:5-disulphonic acid
1-hydroxy-2-(1'-sulphonaphth-2'-ylazo)-8-ω-(N-butylamino)propionylaminonaphthalene-3,6-disulphonic acid
1-hydroxy-2-(1'-sulphonaphth-2'-ylazo)-8-ω-(N-methylamino)acetylaminonaphthalene-3,5-disulphonic acid
1-hydroxy-2-(1'-sulphonaphth-2'-ylazo)-8-ω-(n-methylamino)acetylaminonaphthalene-3,6-disulphonic acid
1-hydroxy-2-(2'-sulphophenylazo)-8-ω-(N-methylamino)acetylaminonaphthalene-3,6-disulphonic acid
1-hydroxy-2-(1',5'-disulphonaphth-2'-ylazo)-8-ω-(N-methylamino)acetylaminonaphthalene-3,6-disulphonic acid
1-hydroxy-2-phenylazo-8-ω-(N-methylamino)acetylaminonaphthalene-3,6-disulphonic acid
1-hydroxy-2-(4'-methoxy-2'-sulphophenylazo)-8-ω-(N-methylamino)acetylaminonaphthalene-3,6-disulphonic acid
1-hydroxy-2-(2',5'-disulphophenylazo)-8-ω-(N-methylamino)acetylaminonaphthalene-3,6-disulphonic acid
1-hydroxy-2-(1'-sulphonaphth-2'-ylazo)-8-ω-aminoacetylaminonaphthalene-3,6-disulphonic acid
1-hydroxy-2-(1'-sulphonaphth-2'-ylazo)-8-ω-aminopropylaminonaphthalene-3,6-disulphonic acid
1-hydroxy-2-(1',5'-disulphonaphth-2'-ylazo)-6-ω-(N-methylamino)acetylaminonaphthalene-3-sulphonic acid
1-hydroxy-2-(1',5'-disulphonaphth-2'-ylazo)-6-ω-(N'-methylamino)acetyl-N-methylaminonaphthalene-3-sulphonic acid
1-hydroxy-2-(1',5'-disulphonaphth-2'-ylazo)-7-ω-(N-methylamino)acetylaminonaphthalene-3-sulphonic acid
1-hydroxy-2-(1'-sulphonaphth-2'-ylazo)-8-ω-(N-propylamino)acetylaminonaphthalene-3,6-disulphonic acid
1-hydroxy-2-(1'-sulphonaphth-2'-ylazo)-8-ω-(N-butylamino)acetylaminonaphthalene-3,6-disulphonic acid
1-hydroxy-2-(1'-sulphonaphth-2'-ylazo)-8-ω-(N-benzylamino)acetylaminonaphthalene-3,6-disulphonic acid In Class (iii)
8-amino-1-hydroxy-2-[4'-(2''-sulphophenylazo)-2'-methoxy-5'-methylphenylazo]naphthalene-3:6-disulphonic acid
4:4'-bis(8''-amino-1''-hydroxy-3'':6''-disulpho-2''-naphthylazo)-3:3'-dimethoxydiphenyl 6-amino-1-hydroxy-2-[4'-(2"-sulphophenylazo)-2'-methoxy-5'-methylphenylazo]naphthalene-3:5-disulphonic acid.

8-ω-(N-methylamino)acetylamino-1-hydroxy-2-[4'-(2",5"-disulphophenylazo)-2'-methoxy-5'-methylphenylazo]naphthalene-3,6-disulphonic acid 4,4'-bis[8"-ω-(N-methylamino)acetylamino-1"-hydroxy-3",6"-disulphonaphth-2"-ylazo]-3,3'-dimethoxydiphenyl.

In Class (iv)

2-(4'-amino-2'-methylphenylazo)naphthalene-4:8-disulphonic acid 2-(4'-amino-2'-acetylaminophenylazo)naphthalene-5:7-disulphonic acid 2-(4'-amino-2'-ureidophenylazo)naphthalene-3:6:8-trisulphonic acid 4-nitro-4'-(4"-methylaminophenylazo)stilbene-2:2'disulphonic acid 4-nitro-4'-(4"-amino-2"-methyl-5"-ω-methoxyphenylazo)stilbene-2:2-disulphonic acid 2-(4'-amino-2'-acetylaminophenylazo)naphthalene-4:8-disulphonic acid 4-amino-2-methylazobenzene-2':5'-disulphonic acid 4-[4'-(2",5"-disulphophenylazo)-2',5'-dimethylphenylazo]-1-naphthylamine-8-sulphonic acid 4-[4'-(2",5",7"-trisulphonaphth-1"-ylazo)-2',5'-dimethylphenylazo]-1-naphthylamine-6-sulphonic acid 2-(4'-methylaminoacetylamino-2'-ureidophenylazo)-naphthalene-3,6,8-trisulphonic acid 4-[4'-(2",5",7"-trisulphonaphth-1"-ylazo)-2',5'-dimethylphenylazo]-1-naphthylamine-7-sulphonic acid 4-[4'-(2",5",7"-trisulphonaphth-1"-ylazo)naphth-1'-ylazo]-1-naphthylamine-6-sulphonic acid 4-[4'-(2",5"-disulphophenylazo)-6'-sulphonaphth-1-ylazo]-1-naphthylamine-8-sulphonic acid 4-[4'-(4"-sulphophenylazo)-2'-sulphophenylazo]-1-naphthylamine-6-sulphonic acid In Class (v)

1-(2',5'-dichloro-4'-sulphophenyl)-3-methyl-4-(3"-amino-4"-sulphophenylazo)-5-pyrazolone 1-(4'-sulphophenyl)-3-carboxy-4-(4"-amino-3"-sulphophenylazo)-5-pyrazolone 1-(2'-methyl-5'1-sulphophenyl)-3-methyl-4-(4"-amino-3"-sulphophenylazo)-5-pyrazolone 1-(2'-sulphophenyl)-3-methyl-4-(3"-amino-4"-sulphophenylazo)-5-pyrazolone 4-amino-4'-(3"-methyl-5"-oxo-1"-phenylpyrazolin-4"-ylazo)stilbene-2:2'-disulphonic acid 4-amino-4'-(2"-hydroxy-3",6"-disulpho-1"-naphthylazo) stilbene-2:2'-disulphonic acid 8-acetylamino-1-hydroxy-2-(3'-amino-4'-sulphophenylazo) naphthalene-3:6-disulphonic acid 7-(3'-sulphophenlamino)-1-hydroxy-2-(4'-amino-2'-carboxyphenylazo)-naphthalene-3-sulphonic acid 8-phenylamino-1-hydroxy-2-('-amino-2'-sulphophenylazo) naphthalene-3:6-disulphonic acid 6-acetylamino-1-hydroxy-2-(5'-amino-2'-sulphophenylazo)naphthalene-3sulphonic acid 6-ureido-1-hydroxy-2-(5'-amino-2'-sulphophenylazo)-naphthalene-3-sulphonic acid 8-benzoylamino-1-hydroxy-2-(5'-amino-2'-sulphophenylazo) naphthalene-3:6-disulphonic acid 1-(4':8'-disulphonaphth-2'-yl)-3-methyl-4-(5"-amino-2"-sulphophenylazo)-5-pyrazolone 1-(2'-sulphophenyl)-3-carboxy-4-(5"-amino-2"-sulphophenylazo)-5-pyrazolone 1-(2':5'-dichloro-4'-sulphophenyl)-3-methyl-4-(5"-amino-2"-sulphophenylazo)-5-pyrazolone 5-(3'-amino-4'-sulphophenylazo)-4-methyl-5-cyano-6-hydroxyprid-2-one 5-(3'-amino-4'-sulphophenylazo)-4-methyl-5-carbonamido-6-hydroxy-N-ethylpyrid-2-one 5-(3'-amino-4'-sulphophenylazo)-4-methyl-6-hydroxypyrid-2-one 5-(3'-amino-4'-sulphophenylazo)-4-methyl-5-cyano-6-hydroxy-N-methylpyridone 5-(4'-amino-3'-sulphophenylazo)-4-methyl-5-cyano-6-hydroxy-N-ethylpyridone 5-(4'-amino-2',5'-disulphophenylazo)-4-methyl-5-cyano-6-hydroxy-N-ethylpyridone 5-(3-amino-4-sulphophenylazo)-3,4-dimethyl-6-hydroxy-1-n-propylpyrid-2-one 5-(4-amino-2,5-disulphophenylazo)-1-n-butyl-6-hydroxy-4-methyl-3-sulphomethylpyrid-2-one 5-(3-amino-4-sulphophenylazo)-1-ethyl-6-hydroxy-4-methyl-3-sulphopyrid-2-one 5-(3-amino-4-sulphophenylazo)-3-chloro-1-ethyl-6-hydroxy-4-methylpyrid-2-one 5-(3-amino-4-sulphophenylazo)-3-cyano-1-ethyl-6-hydroxy-4-sulphomethylpyrid-2-one 5-(3-amino-4-sulphophenylazo)-3-aminocarbonyl-6-hydroxy-4-methyl-1-[2-(4-sulphophenyl)ethyl]pyrid-2-one.

1-hydroxy-2-(1'-sulpho-5'-aminomethylnaphth-2'-ylazo)-8-benzoylaminonaphthalene-3,6-disulphonic acid 1-(2',5'-dichloro-4'-sulphophenyl)-3-methyl-4-(1"-sulpho-5"-aminomethylnaphth-2"-ylazo)-5-pyrazolone 1-(4'-sulphophenyl)-3-carboxy-4-(1"-sulpho-5"-aminomethylnaphth-2"-ylazo)-5-pyrazolone 1-hydroxy-2(1'-sulpho-5'-aminomethylnaphth-2'-ylazo)-6-acetylaminonaphthalene-3-sulphonic acid 1-hydroxy-2-(1'-sulpho-5'-aminomethylnaphth-2'-ylazo)-8-benzoylaminonaphthalene-3,5-disulphonic acid 1-hydroxy-2-(1'-sulpho-5'-aminomethylnaphth-2'-ylazo)-6-(N-acetyl-N-methylamino)naphthalene-3-sulphonic acid 1-hydroxy-2-(1'-sulpho-5'-aminomethylnaphth-2'-ylazo)-7-acetylaminonaphthalene-3-sulphonic acid 1-hydroxy-2-[4'-(1"-sulpho-5|-aminomethylnaphth-2"-ylazo)-6'-sulphonaphth-1-ylazo]-8-acetylaminonaphthalene-3,6-disulphonic acid 1-hydroxy-2-(1'-sulpho-5'-aminomethylnahth-2'-ylazo)-7-(2",5"-disulphophenylazo)-8-aminonaphthalene-3,6-disulphonic acid 1-hydroxy-2-(1'-sulpho-5'-aminomethylnaphth-2'-ylazo)-8-acetylaminonaphthalene-3,6-disulphonic acid 1-hydroxy-2-[4'-(5"-aminomethyl-4"-methyl-2"-methyl-2"-sulphophenylazo)-6'-sulphonaphth-1-ylazo]-6-acetylaminonaphthalene-3-sulphonic acid 5-(5'-aminomethyl-4'-methyl-2'-sulphophenylazo)-1-ethyl-6-hydroxy-4-methyl-3-sulphopyrid-2-one 1-hydroxy-2-5'-aminomethyl-4"-methyl-2"-sulphophenylazo)-7-(1"',5"-disulphonaphth-2"-ylazo)-8-aminonaphthalene-3,6-disulphonic acid 1-hydroxy-2-(4'-aminoacetylphenylazo)-6-acetylaminonaphthalene-3,5-disulphonic acid 1-hydroxy-2-[4'-(4"-aminomethyl-2"-sulphophenylazo)-2'-methoxyphenylazo]-naphthalene-3,6,8-trisulphonic acid 1-(4'-sulphophenyl)-3-carboxy-4-(4"-methylaminoacetylamino-2"-sulphophenylazo)-5-pyrazolone 1-(3'-methylaminoacetylaminophenyl)-3-carboxy-4-(1",5"-disulphonaphth-2"-ylazo)-5-pyrazolone 1-hydroxy-2-(4'-β-aminoethylphenylazo)-8-acetylaminonaphthalene-3:6-disulphonic acid 1-hydroxy-2-(4'-N-β-aminoethyl-N-acetylaminophenylazo)-8-acetylaminonaphthalene-3:6-disulphonic acid 1-hydroxy-2-(4'-aminomethylphenylazo)-6-acetylaminonaphthalene-3:5-disulphonic acid 1-hydroxy-2-(3'-β-aminoethylsulphonylphenylazo)-6-acetylaminonaphthalene-3:5-disulphonic acid 1-hydroxy-2-(3'-β-aminoethylsulphonylphenylazo)-8-acetylaminonaphthalene-3:6-disulphonic acid 1-hydroxy-2-(4'-β-aminoethylcarbamoylphenylazo)-8-acetylaminonaphthalene-3:6-disulphonic acid 1-hydroxy-2-(3'-β-aminoethylcarbonylphenylazo)-6-acetylaminonaphthalene-3:5-disulphonic acid 1-hydroxy-2-(3'-β-aminoethylsulphamoylphenylazo)-8-acetylaminonaphthalene-3:6-disulphonic acid 1-hydroxy-2-(1'-sulpho-5'-β-aminoethylsulphamoylnaphth-2-ylazo)-8-benzoylamino-3:6-disulphonic acid 1-hydroxy-2-(1'-sulpho-5'-β-aminoethylsulphamoylnaphth-2-ylazo)-8-acetylamino-3:5-disulphonic acid In Class (vi)

1-(3'-aminophenyl)-3-methyl-4-(2':5'-disulphophenylazo)-5-pyrazolone 1-(3'-aminophenyl)-3-carboxy-4-(2'-carboxy-4'-sulphophenylazo)-5-pyrazolone 1-(3'-amino-acetylaminophenyl)-3-methyl-4-(2',5'-disulphophenylazo)-5-pyrazolone 4-amino-4'-[3"-methyl-4"-(2"':5"'-disulphophenylazo)-1"-pyrazol-5"-onyl]stilbene-2:2'-disulphonic acid 1-(3'-aminophenyl)-3-carboxy-4-[4"-(2"':5"'-disulphophenylazo)-2"-methoxy-5"-methylphenylazo]-5-pyrazolone 1-(2-aminoethyl-3-(1,5-disulphonaphth-2-ylazo)-6-hydroxy-4-methylpyrid-2-one 1-(2-aminoethyl)-3,4-dimethyl-5-(1,5-disulphonaphth-2-ylazo)-6-hydroxypyrid-2-one 3-aminocarbonyl-1-(2-aminoethyl)-6-hydroxy-4-methyl-5-(3,6,8-trisulphonaphth-2-ylazo)-pyrid-2-one 1-(2-aminoethyl)-3-cyano-5-(2,5-disulphophenylazo)-6-hydroxy-4-methylpyrid-2-one In Class (vii)

The copper complex of 8-amino-1-hydroxy-2-(2'-hydroxy-5'-sulphophenylazo)naphthalene-3:6-disulphonic acid The copper complex of 6-amino-1-hydroxy-2-(2'-hydroxy-5'-sulphophenylazo)naphthalene-3-sulphonic acid The copper complex of 6-amino-1-hydroxy-2-(2'-hydroxy-5'-sulphophenylazo)naphthalene-3:5-disulphonic acid The copper complex of 8-amino-1,1'-dihydroxy-2,2'azo naphthalene-3,4',6,8'-tetrasulphonic acid The copper complex of 8-amino-1-hydroxy-2-[4'-(2"-sulphophenylazo)-2'-methoxy-5'-methylphenylazo]-naphthalene-3:6-disulphonic acid The copper complex of 6-amino-1-hydroxy-2-[4'-(2":5"-disulphophenylazo)-2'-methoxy-5'-methylphenylazo]naphthalene-3,5-disulphonic acid The copper complex of 1-(3'-amino-4'-sulphophenyl)-3-methyl-4-[4"-(2"':5"'-disulphophenylazo)-2"-methoxy-5"-methylphenylazo]-5-pyrazolone The copper complex of 7-(4'-amino-3'-sulphoanilino)-1-hydroxy-2-[4"-(2"':5"'-disulphophenylazo)-2"-methoxy-5"-methylphenylazo]naphthalene-3-sulphonic acid The copper complex of 6-(4'-amino-3'-sulphoanilino)-1-hydroxy-2-(2"-carboxyphenylazo)naphthalene-3-sulphonic acid The copper complex of 1-hydroxy-2-[4'-(5"-aminoethyl-4"-methyl-2"-sulphophenylazo)-5'-methyl-2'-hydroxyphenylazo]-8-acetylaminonaphthalene-3,6-disulphonic acid The copper complex of 1-hydroxy-2-(3'-chloro-5'-sulpho-2'-hydroxyphenylazo)-8-ω-(N-methylamino)acetylaminonaphthalene-3,6-disulphonic acid The copper complex of 1-hydroxy-2-(3',5'-disulpho-2'-hydroxyphenylazo)-6-ω-(N-methylamino)acetylaminonaphthalene-3-sulphonic acid The trisodium salt of the copper complex of 1-hydroxy-2-[4'-(2",5"-disulphophenylazo)-5'-methyl-2'-hydroxyphenylazo]-6-ω-(N-methylamino)acetylaminonaphthalene-3-sulphonic acid In Class (viii)

3-(3'-amino-4'-sulphophenyl)sulphamyl copper phthalocyaninetri-3-sulphonic acid, 4-(3'-amino-4'-sulphophenyl)sulphamyl copper phthalocyanine-tri-4-sulphonic acid, 3-(3'- or 4'-aminophenyl)sulphamyl copper phthalocyanine-3-sulphonamide-di-3-sulphonic acid, 3-(2-aminoethyl)sulphamyl copper phthalocyanine-tri-3-sulphonic acid.

In Class (ix)

4-amino-2'-nitro-diphenylamine-3:4'-disulphonic acid

4-ω-(N-methylamino)acetylamino-2'-nitrodiphenylamine-3,4'-disulphonic acid

In Class (x)

The copper complex of N-(2-hydroxy-5-sulpho-3-aminophenyl)-N¹-(2'-carboxy-4'-sulphophenyl)-ms-phenylformazan, The copper complex of N-(2-hydroxy-5-sulpho-3-aminophenyl)-N¹-(2'-carboxy-4'-sulphophenyl)-ms-(4"-sulphophenyl)formazan, The copper complex N-(2-hydroxy-5-sulphophenyl)-N¹-(2'-carboxy-4'-aminophenyl)-ms-(2"-sulphophenyl)formazan, The copper complex of N-(2-hydroxy-5-sulphophenyl)-N¹-(2'-carboxy-4'-aminophenyl)-ms-(2"-chloro-5"-sulphophenyl)formazan, The copper complex of N-(2-hydroxy-5-sulphophenyl)-N¹-(2'-carboxy-4'-sulphophenyl)-ms-(4"-aminophenyl)formazan, The copper complex or N-(2-hydroxy-5-sulphophenyl)-N¹-(2'-carboxy-4'-sulphophenyl)-ms-(4"-amino-2"-sulphophenyl)formazan The copper complex of N-(2-carboxy-4-aminophenyl)-N¹-(2'-hydroxy-4'-sulphonaphth-1'-yl)-ms-(2"-sulphophenyl)formazan The copper complex of N-(2-hydroxy-5-sulphophenyl)-N'-(2'-carboxy-4'-sulphophenyl)-ms-(4"-aminoacetylaminophenyl)formazan.

In Class (xi)

4-amino-4'-nitrostilbene-2,2'-disulphonic acid

4-ω-(N-methylamino)acetylaminostilbene-2,2'-disulphonic acid

In Class (xii)

3,10-diamino-6,13-dichlorotriphenodioxazine-4,11-disulphonic acid 3,10-bis(4'-amino-3'-sulphoanilino)-6,13-dichlorotriphendioxazine-4,11-bisulphonic acid.

3,10-bis-(4'-amino-2',5'-disulphoanilino)-6,13-dichlorotriphendioxazine-4,11-disulphonic acid 3-(4'-amino-3'-sulphoanilino)-10-(4'-amino-2',5'-disulphoanilino)-6,13-dichlorotriphendioxazine-4,11-disulphonic acid 3,10-di-(2'-aminoethylamino)-6,13-dichlorotriphendioxazine-4,11-disulphonic acid 3,10-bis(3'-amino-4'-sulphoanilino)-6,13-dichlorotriphendioxazine-4,11-disulphonic acid.

In Class (xiii)

Anhydro-9-(4-amino-3-sulphoanilino)-5-anilino-7-phenyl-4-sulpho or 2,4- 4,11-disulphobenz[a]phenazinium hydroxide Anhydro-9-(4-amino-3-sulphoanilino)-5-p-toluedino-7-p-tolyl-2,4-disulphobenz[a]phenazinium hydroxide Anhydro-9-(4-amino-3-sulphoanilino)-5-p-toluidino-7-p-methoxyphenyl-2,4-disulphobenz[a]phenazinium hydroxide Anhydro-3-(4-amino-3-sulphoanilino)-7-N-ethyl-N-(3 or 4 sulphobenzyl)amino-5-(2,3 or 4-sulphophenyl)-phenazinium hydroxide Anhydro-3-(4-amino-3-sulphoanilino)-7-N-ethyl-N-(3 or 4 sulphobenzyl)amino-1-methyl or methoxy-5-(2-sulphophenyl)phenazinium hydroxide Anhydro-3-(4-amino-3-sulphoanilino)-7-N-ethyl-N-(3 or 4 sulphobenzyl)amino-5-(4-chloro, methoxy or methyl-3-sulphophenyl) phenazinium hydroxide Anhydro-5-(4-amino-2,5-disulphoanilino)-9-diethylamino-7-phenyl-10-sulphobenz[a]phenazinium hydroxide Anhydro-3,7-bis[N-ethyl-N-(3 or 4-sulphobenzyl)]-5-(3 or 4-amino-4or 3-sulphophenyl)phenazinium hydroxide.

Anhydro-3-(4-amino-3-sulphoanilino)-7-N-ethyl-N-(2-sulphoethyl)amino-5-(2,3 or 4-sulphophenyl)-phenazinium hydroxide.

Anhydro-3-(4-amino-3-sulphoanilino)-7-N-methyl-N-(2-sulphoethyl)-5-(3 or 4-amino-4 or 3-sulphophenyl)-phenazinium hydroxide.

As examples of compounds of formula (2) which may be used in the process of the invention there may be mentioned 2,4,6-trifluoro-5-chloro-3-cyanopyridine
2,4,6-trifluoro-3,5-dichloropyridine
2,4,5,6-tetrafluoro-3-cyanopyridine
2,4,5,6-tetrachloro-3-cyanopyridine
2,3,4,5,6-pentafluoropyridine It will be appreciated that the halo pyridine intermediates of formula (2) may be hydrolysed during the manufacture of the reactive dye in an aqueous medium and this is clearly undesirable. The chromophoric compound used in the process of the present invention should be selected to be sufficiently reactive towards the compound of formula (2) used so that the dye of formula (1) can be formed with a minimum of concomitant hydrolysis of the halogen atoms on the pyridine nucleus.

The present invention provides a further process for the manufacture of dyes of formula (1) which comprises reacting a compound of formula (2) with a precursor of a chromophoric compound which contains one or more OH, SH or

groups and converting the resulting product into a chromophoric compound of formula (1).

This further process is particularly applicable to dyes of formula (1) containing azo groups. The compound of formula (2) is reacted with diazotisable amine or coupling component having a suitable OH, SH or

group and the resulting intermediate converted to an azo dye by respectively diazotising and coupling with a coupling component or by coupling with a diazotised amine. In suitable instances both the diazotisable amine and coupling component may be reacted with a compound of formula (2) before being coupled together to form an azo dye of formula (1) in which n is at least 2.

As examples of suitable diazotisable amines for use in the further process of the present invention there may be mentioned 2-sulpho-4- or 5-aminoaniline. It will be appreciated that such compounds are reacted with only one mole of the compound of formula (2) to leave one amino group available for diazotisation.

As examples of suitable coupling components for use in the further process of the present invention there may be mentioned 1-amino-8-hydroxy-3,6-disulphonaphthalene
2-amino-5-hydroxy-7-sulphonaphthalene
2-amino-8-hydroxy-6-sulphonaphthalene
3-aminocarbonyl-1-($\beta$-aminoethyl)-6-hydroxy-4-methylpyrid-2-one The dyestuffs of the present invention may be used for colouring a wide range of textile materials containing hydroxyl or amino groups, e.g. wool, silk, synthetic polyamides and natural or regenerated cellulose, for example, cotton or viscose rayon materials, by the conventional methods used for colouring such materials with water-soluble reactive dyes, e.g. in the case of cellulose they are preferably applied in conjunction with a treatment with an acid-binding agent, e.g. caustic soda, sodium carbonate, phosphate, silicate or bicarbonate, which may be applied to the cellulose textile materials before, during or after the application of the dyestuff. The method, technique and conditions used for applying the dyestuff to the textile material will be selected according to various factors, e.g. the nature of the fibre or fibres present and the physicl form of the textile material, for example, methods will vary depending on whether the fibre is loose or spun into thread which in turn may be in hanks or wound on bobbins or converted in cloth or garments by knitting, or weaving. Any of the usual methods of dyeing or printing may be employed to apply the dye to the textile material and other dyestuffs and/or pigments may be also applied simultaneously or sequentially with the dyestuffs of the present invention using such combinations of conditions as are dictated by the properties of the dyestuffs and/or pigments. Such mixed dyeings are particularly valuable if the textile containing OH or NH$_2$groups is blended with other textile fibres free from such groups e.g. polyesters. The dyeing may be carried out in a batchwise manner using, for example exhaustion techniques in a beck, winch, jet, paddle or jig device, in particular for hanks, woven or knitted fabrics or garments; or it may be applied by a "package" dyeing technique to fibres wound in cakes or on cones, bobbins or warp beams, especially when these supports are perforated, or to loose fibres enclosed in permeable containers such as cages, pressure and/or vacuum may be employed to facilitate penetration and circulation through the packages. Alternatively continuous or semi-continuous dyeing methods may be employed, such as those employing padding techniques e.g. by padding mangles whereby the textile material is impregnated with dye liquor and then passed through rollers to control the amount of liquor retained, followed by one or more of a variety of post treatments e.g. drying, jig or winch development, baking, steaming, repadding in further solutions such as acid binding agents as mentioned above, storage in a moist condition at ambient or elevated temperatures passing over heated rollers or passing through batch-wise or continuous washing procedures. These post treatments may also incorporate finishing stages at which for example, antistatic or crease resistance agents can be incorporated. Textiles in sheet form may also be coloured by textile printing methods such as printing with engraved or embossed rollers or through screens or by transfer techniques such as wet transfer printing. Details of these and other suitable printing methods are described in "The Principles and Practise of Textile Printing" by E. Knecht, J. B. Fothergill and G. Hurst 4th Edition 1952 Published by Griffin or in "An Introduction to Textile Printing" by W. Clarke 4th Edition 1974 Published by Newnes Butterworth.

The dyestuffs of the present invention show advantageous properties, for example they may be fixed to cellulose fibres at relatively low temperatures and the resulting dyed fibres show good fastness to wet treatments such as washing and in particular show a good resistance to "acid bleeding". Some dyes of the present invention are best fixed at somewhat higher temperatures, e.g. 60° or even 80° C. when they often show desirable properties as good or better than, for example, conventional monochlorotriazinyl reactive dyes.

The invention is illustrated but not limited by the following Examples in which all parts and percentages are by weight.

EXAMPLE 1

7.5 Parts of the trisodium salt of 1-hydroxy-1(1'-sulpho-5'-aminomethylnaphth-2'-ylazo)-8-benzoylaminonaphthalene-3,5-disulphonic acid (prepared as described in Example 3 of U.K. Pat. No. 1,431,322) is dissolved in 700 parts of water at 40° C. and 3 parts of 2,4,6-trifluoro-3-cyanochloropyridine dissolved in 25 parts of acetone is added dropwise whilst the pH is maintained at approximately 6.0 by additions of 2N caustic soda solution. The solution is salted (10% w/v), filtered and dried to give 8.4 parts of the product.

When used to dye cotton from aqueous dyebaths at 40° C. in the presence of salt and soda ash it gives an attractive red shade with excellent fastness properties.

The following Table gives further Examples of dyestuffs of the invention which may be obtained by replacing the 7.5 parts of the trisodium salt of 1-hydroxy-2-(1'-sulpho-5'-aminomethylnaphth-2'-ylazo)-8-benzoylaminonaphthalene-3,5-disulphonic acid by an equivalent amount of the compound listed in Column II of the Table and by replacing the 3.0 parts of 2,4,6-trifluoro-3-cyan-5-chloropyridine by an equivalent amount of halogenoheterocyclic compound listed in Column III of the Table.

| I | II | III | IV |
|---|---|---|---|
| 2 | trisodium salt of 1-hydroxy-2-(1'-sulpho-5'-aminomethyl-naphthyl-2'-ylazo)-8-benzoylaminonaphthalene-3.6-disulphonic acid | 2:4:6-trifluoro-3-cyano-5-chloro-pyridine | Red |
| 3 | trisodium salt of 1-hydroxy-2-(1'-sulpho-5'aminomethyl-naphthyl-2'-ylazo)-8-benzoyl-aminonaphthalene-3,6-sulphonic acid | 3-cyano-2,4,5,6-tetra-fluoropyridine | " |
| 4 | disodium salt of 1-(2',5'-dichloro-4'-sulphophenyl)-3-methyl-4-(1''-sulpho-5''-aminomethylnaphth-2''-ylazo)-5-pyrazolone | 2:4:6-trifluoro-3-cyano-5-chloropyridine | Yellow |
| 5 | disodium salt of 1-(4''-sulpho-phenyl)-3-carboxy-4-(1''-sulpho-5'''-aminomethylnaphth-2''-ylazo)-5-pyrozolone | 2:4:6-trifluoro-3-cyano-5-chloropyridine | " |
| 6 | disodium salt of 1-hydroxy-2-(1'-sulpho-5'-aminomethyl-naphth-2'-ylazo)-6-acetyl-aminonaphthalene-3-sulphonic acid | 2:4:6-trifluoro-3-cyano-5-chloropyridine | Orange |
| 7 | disodium salt of 1-hydroxy-2-(1'-sulpho-5'-aminomethyl-naphth-2-ylazo)-6-(N-acetyl-N-methylamino)naphthalene-3-sulphonic acid | 2:4:6-trifluoro-3-cyano-5-chloropyridine | " |
| 8 | disodium salt of 1-hydroxy-2-(1'-sulpho-5'-aminomethyl-naphth-2-ylazo)-6-(N-acetyl-N-methylamino)naphthalene-3-sulphonic acid | 3-cyano-2,4,5,6-tetra-fluoropyridine | " |
| 9 | disodium salt of 1-hydroxy-2-(1'-sulpho-5'-aminomethyl-naphth-2'-ylazo)-7-acetyl-aminonaphthalene-3-sulphonic acid | 2,4,6-trichloro-3-cyano-5-chloro-pyridine | Red |
| 10 | tetrasodium salt of 1-hydroxy-2-[4'-(1'''-sulpho-5''amino-methylnaphth-2''-ylazo-6'- | 2,4,6-trichloro-3-cyano-5-chloro-pyridine | Red |

| I | II | III | IV |
|---|---|---|---|
| | sulphonaphth-1'-ylazo]-8-acetylaminonaphthalene-3,6-disulphonic acid | | |
| 11 | pentasodium salt of 1-hydroxy-2-(1'-sulpho-5'-aminomethyl-naphth-2'-ylazo)-7-(2'',5''-disulphophenylazo)-8-aminonaphthalene-3,6-disulphonic acid | 2,4,6-trichloro-3-cyano-5-chloro-pyridine | Navy-blue |
| 12 | disodium salt of 1-hydroxy-2-(1'-sulpho-5'-aminomethyl-naphth-2'-ylazo)-8-acetyl-aminonaphthalene-3,6-disulphonic acid | 2,4,6-trichloro-3-cyano-5-chloro-pyridine | Red |
| 13 | disodium salt of 1-hydroxy-2-(1'-sulpho-5'-aminomethyl-naphth-2'-ylazo)-8-acetyl-aminonaphthalene-3,6-disulphonic acid | 3-cyano-2,4,5,6-tetrafluoropyridine | " |
| 14 | trisodium salt of 1-hydroxy-2-[4'-(5''-aminomethyl-4''-methyl-2''-sulphophenylazo)-6'-sulphonaphth-1'-ylazo]-6-acetylaminonaphthalene-3-sulphonic acid | 2:4:6-trifluoro-3-cyano-5-chloro-pyridine | Blue-violet |
| 15 | trisodium salt of the copper complex of 1-hydroxy-2-[4'-(5''-aminomethyl-4''-methyl-pyridine 2''-sulphophenylazo)-5'-methyl-2'-hydroxyphenylazo]-8-acetylaminonaphthalene-3,6-disulphonic acid | 2:4:6-trifluoro-3-cyano-5-chloro- | Navy-blue |
| 16 | tetrasodium salt of 1-hydroxy-2-[4'-(4''-aminomethyl-2''-sulphophenylazo)-2'-methoxy-phenylazo]naphthalene-3,6,8-trisulphonic acid | 2:4:6-trifluoro-3-cyano-5-chloro-pyridine | Blue-violet |
| 17 | disodium salt of 5-(5'-amino-methyl-4'-methyl-2'-sulpho-phenylazo)-1-ethyl-6-hydroxy-4-methyl-3-sulphopyrid-2-one | 2:4:6-trifluoro-3-cyano-5-chloro-pyridine | Yellow |
| 18 | pentasodium salt of 1-hydroxy-2-(5'-aminomethyl-4'-methyl-2'-sulphophenylazo)-7-(1'',5''-disulphonaph-2'''-ylazo)-8-aminonaphthalene-3,6-disulphonic acid | 2:4:6-trifluoro-3-cyano-5-chloro-pyridine | Navy-blue |

EXAMPLE 19

6.9 Parts of the trisodium salt of 1-hydroxy-2(1'-sulphonaphth-2'-yl-azo)-8-ω-(N-methylamino)acetylaminonaphthylene-3,6-disulphonic acid is dissolved in 100 parts of water at 20° C. and 2.0 parts of 2:4:6-trifluoro-3-cyano-5-chloropyridine dissolved in 5 parts of acetone is added all at once. The reaction is stirred at 18°-20° C. and the pH maintained at 6.5-7.5 by the addition of 2 N sodium carbonate solution as required until complete. After screening, the solution is buffered by the addition of 1 part of mixed phosphate buffer (pH 7) and the solution is evaporated to dryness using a rotary evaporator under water pump vacuum. The residue was a red dyestuff which fixed to cotton at 40° C. in the presence of acid-binding agent.

The trisodium salt of 1-hydroxy-2(1'-sulphonaphth-2'-ylazo)-8-ω-(N-methylamino)acetylaminonaphthylene-3:6-disulphonic acid used in the above example is prepared by coupling diazotised 2-aminonaphthalene-1-sulphonic acid on to 1-hydroxy-8-N-methylaminoacetylaminonaphthalene-3:5-disulphonic acid in aqueous solution at pH 6-7.

The 1-hydroxy-8-ω-(N-methylamino)acetylaminonaphthalene-3:6-disulphonic acid itself is prepared as follows:

148 Parts of the monosodium salt of 1-hydroxy-8-aminonaphthalene3:6-disulphonic acid is dissolved in 2000 parts of water containing 200 parts of sodium acetate crystals at 35° C. After cooling the solution to 0°-5° C. a solution of 66 parts of chloroacetyl chloride in 60 parts of acetone is added dropwise over 20 minutes keeping the temperature at 0°-5° C. Following this addition the mixture is allowed to stir for 1½ before the addition of salt (15% w/v). The precipitate so obtained is collected by filtration and washed with 1000 parts of 15% salt solution. The wet paste is added to 250 parts of methylamine solution (40%) keeping the temperature below 30° C., the mixture subsequently being stirred overnight at 20° C. Concentrated hydrochloric acid is added until the mixture is just acid. The solid is collected by filtration and recrystallised from water to give 82.5 parts of product as a colourless solid.

The following Table gives further Examples of dyestuffs of the invention which may be obtained by replacing the 6.9 parts of the trisodium salt of 1-hydroxy-2-(1'-sulphonaphth-2'-ylazo)-8-ω-(N-methylamino)-acetylaminonaphthalene-3,6-disulphonic acid by an equivalent amount of the compound listed in Column II of the Table and by replacing the 2.0 parts of 2,4,6-trifluoro-3-cyano-5-chloropyridine by an equivalent amount of the halogenoheterocyclic compound listed in Column III of the Table. Column IV indicates the colour of the resultant dyeing on cotton.

| I | II | III | IV |
|---|---|---|---|
| 20 | trisodium salt of 1-hydroxy-2-(2'-sulphophenylazo)-8-ω(N-methylamino)acetylaminonaphthalene-3,6-disulphonic acid | 3-cyano-2,4,5,6-tetrafluoropyridine | Yellowish-red |
| 21 | tetrasodium salt of 1-hydroxy-2-(1',5'-disulphonaphth-2'-yl-azo)-8-ω-(N-methymino)-acetylaminonaphthalene-3,6-disulphonic acid | 3-cyano-2,4,6-trifluoro-5-chloro pyridine | Bluish-red |
| 22 | trisodium salt of 1-hydroxy 2-(4'-methoxy-2'-sulpho phenylazo)-8-ω-(N-methyl-amino)acetylaminonaphthalene-3,6-disulphonic acid | 2,3,4,5,6-penta-fluoropyridine | Rubine |
| 23 | tetrasodium salt of 1-hydroxy-2-(2',5'-disulpho phenylazo)-8-ω-(N-methyl-amino)acetylamino naphthalene | 3-cyano-2,4,6 trifluoro-5-chloro-pyridine | Red |
| 24 | trisodium salt of 1-hydroxy-2-(1'-sulphonaphth-2'-ylazo)-8-ω-aminoacetylamino-naphthalene-3,6-disulphonic acid | 3-cyano-2,4,6-trifluoro-5-chloro-pyridine | Bluish-red |
| 25 | trisodium salt of 1-hydroxy-2-(1'-sulphonaphth-2'-ylazo)-8-ω-aminopropionylamino-naphthalene-3,6-disulphonic acid | 3-cyano-2,4,6-trifluoro-5-chloro-pyridine | Bluish-red |
| 26 | trisodium salt of 1-hydroxy-2-(1'-sulphonaphth-2'-ylazo)-8-ω-(N-methylamino)propionyl-aminonaphthalene-3-1,6-disulphonic acid | 3-cyano-2,4,6-trifluoro-5-chloro- | Bluish-red |
| 27 | trisodium salt of 1-hydroxy-2-(1'-sulphonaphth-2'-ylazo)-8-ω-(N-ethylamino)acetyl-aminonaphthalene-3,6-disulphonic acid | 3-cyano-2,4,6-trifluoro-5-chloro-pyridine | Bluish-red |
| 28 | trisodium salt of 1-hydroxy-2-(1'-sulphonaphth-2'-ylazo)-8-ω-(N-propylamino)acetyl-aminonaphthalene-3,6-disulphonic acid | 3-cyano-2,4,6-trifluoro-5-chloro-pyridine | Bluish-red |
| 29 | trisodium salt of 1-hydroxy-2-(1'-sulphonaphth-2'-ylazo)-8-ω-(N-butylamino)acetyl-aminonaphthalene-3,6-disulphonic acid | 3-cyano-2,4,6-trifluoro-5-chloro-pyridine | Bluish-red |
| 30 | trisodium salt of 1-hydroxy-2-(1'-sulphonaphth-2'-ylazo)-8-ω-(N-benzylamino)acetyl-amino-naphthalene-3,6-disulphonic acid | 3-cyano-2,4,6-trifluoro-5-chloro-pyridine | Bluish-red |
| 31 | trisodium salt of 1-hydroxy-2-(1'-sulphonaphth-2'-ylazo)-8-ω-(N-butylamino)propionyl-aminonaphthalene-3,6-disulphonic acid | 3-cyano-2,4,6-trifluoro-5-chloro-pyridine | Bluish-red |
| 32 | trisodium salt of 1-hydroxy-2-(1'-sulphonapth-2'-ylazo)-8-ω-(N-methylamino)acetyl-aminonaphthalene-4,6-disulphonic acid | 3-cyano-2,4,6-trifluoro-5-chloro- | Bluish-red |
| 33 | disodium salt of 1-hydroxy-2-(4'-methoxy-2'-sulphophenyl-azo)-6-ω-(N-methylamino) acetylaminonaphthalene-3-sulphonic acid | 3-cyano-2,4,6-trifluoro-5-chloro- | Scarlet |
| 34 | disodium salt of 1-hydroxy-2-(4'-methoxy-2'-sulphophenyl-azo)-6-ω-(N-methylamino)-acerylaminonaphthalene-3-sulphonic acid | 3-cyano-2,4,5,6-tetrafluoro-pyridine | " |
| 35 | trisodium salt of 1-hydroxy-2-(1',5'-disulphonaphthyl-2'- | 3-cyano-2,4,5,6-tetrafluoro- | Orange |

-continued

| I | II | III | IV |
|---|---|---|---|
|  | ylazo-6-ω-(N-methylamino)-acetylaminonaphthalene-3-sulphonic acid | pyridine |  |
| 36 | trisodium salt of 1-hydroxy-2-(1',5'-disulphonaphth-2'-yl azo)-6-ω-(N-methylamino)acetyl-aminonaphthalene-3-sulphonic acid | 3-cyano-2,4,6 trifluoro-5-chloro pyridine | Orange |
| 37 | trisodium salt of 1-hydroxy-2-(1',5'-disulphonaphth-2'-yl azo)-6-ω-(N''-methylamino)-N-acetyl-N-methylamino-naphthalene-3-sulphonic acid | 3-cyano-2,4,6-trifluoro-5-chloro-pyridine | " |
| 38 | trisodium salt of 1-hydroxy-2 (1',5'-disulphonaphth-2'-yl azo)-7-ω-(N-methylamino)-acetylaminonaphthalene-3-sulphonic acid | 3-cyano-2,4,6-trifluoro-5-chloro-pyridine | Red |
| 39 | trisodium salt of the copper complex of 1-hydroxy-2-(3'-chloro-5'-sulpho-2'-hydroxy phenylazo)-8-ω-(N-methyl-amino)acetylaminonaphthalene-3,6-disulphonic acid | 3-cyano-2,4,6-trifluoro-5-chloro-pyridine | Violet |
| 40 | trisodium salt of the copper complex of 1-hydroxy-2-(3',5' disulpho-2'-hydroxyphenylazo)-6-ω-(N-methylamino)acetylamino-naphthalene-3-sulphonic acid | 3-cyano-2,4,6-trifluoro-5-chloro-pyridine | Rubine |
| 41 | trisodium salt of the copper complex of 1-hydroxy-2-[4'-(2'',5''-disulphophenylazo) 5'-methyl-2'-hydroxyphenylazo]-6-ω-(N-methylamino)acetylamino-naphthalene-3-sulphonic acid | 3-cyano-2,4,6-trifluoro-5-chloro-pyridine | Navy blue |
| 42 | trisodium salt of 2-(4' methylaminoacetylamino-2'-ureidophenylazo)naphthalene-3,6,8-trisulphonic acid | 3-cyano-2,4,6-trifluoro-5-chloro-pyridine | Yellow |
| 43 | trisodium salt of 1-(4'-sulpho phenyl)-3-carboxy-4-(4''-methyl aminoacetylamino-2''-sulpho phenylazo)-5-pyrazolone | 3-cyano-2,4,6-trifluoro-5-chloro-pyridine | " |
| 44 | trisodium salt of 1-(3'-methyl aminoacetylaminophenyl)-carboxy-4-(1'',5''-disulpho-naphth-2''-ylazo)-5-pyrazolone | 3-cyano-2,4,6-trifluoro-5-chloro-pyridine |  |

EXAMPLE 45

6.1 Parts of the trisodium salt of 3-ureido-4-(3':6':8'-trisulphonaphth-2'-ylazo)aniline is dissolved in 50 parts of water by warming and the solution cooled to 25° C. A solution of 1.93 parts of 2:4:6-trifluoro-3-cyano-5-chloropyridine in 10 parts of acetone is added to the mixture and the pH maintained at 6–7 by additions of sodium carbonate solution and the temperature at 35°–40° C. After a reaction period of 2 hours a further 1 part of 2:4:6-trifluoro-3-cyano-5-chloropyridine in acetone solution is added in two portions at 30 minute intervals still maintaining the pH at 6–7 and the temperature at 35°–40° C. Salt (30% w/v) is next added and the precipitated yellow dye collected by filtration and dried in vacuo at 20° C. to give 3.3 parts of product. This was used to dye cotton a bright yellow shade by applying at 40° C. in the presence of an acid-binding agent.

The following Table gives further Examples of dyestuffs of the invention which may be obtained by replacing the 6.1 parts of the trisodium salt of 3-ureido-4-(3',6',8'-trisulphonaphth-2'-ylazo)aniline by an eqivalent amount of the compound listed in Column II of the Table. Column III of the Table indicates the colour produced when the resulting dye is applied to cotton.

| I | II | III |
|---|---|---|
| 46 | disodium salt of 1-amino-4-(3'-amino-2',4',6'-trimethylanilino)anthraquinone-2,5'-disulfphonic acid | Blue |
| 47 | disodium salt of 6-amino-1-hydroxy-2-(2'-sulphophenylazo)naphthalene-3-sulphonic acid | Orange |
| 48 | trisodium salt of the copper complex of 6-amino-1-hydroxy-2-[4'-(2'',5''-disulphophenylazo)-2'-hydroxy-5'-methylphenylazo]naphthalene-3 sulphonic acid | Navy-blue |
| 49 | disodium salt of 2-(4'-amino-2'-methylphenylazo)-naphthalene-4,8-disulphonic acid | Yellow |
| 50 | disodium salt of 2-(4'-amino-2'-ccetylaminophenyl-azo)naphthalene-5,7-disulphonic acid | " |
| 51 | disodium salt of 4-nitro-4'-aminostilene-2,2' disulphonic acid | " |
| 52 | disodium salt of 1-(2'-aminoethyl)-3-(1'',5'' disulphonaphth-2''-ylazo)-6-hydroxy-4-methylpyrid-2-one | " |
| 53 | trisodium salt of 3-(2'-aminoethylsulphamoyl)-copper phthalocyanine-3'',3''8,3''''-trisulphonic acid | Turquoise |
| 54 | trisodium salt of the copper complex of N-(2-hydroxy-5-sulpho-3-aminophenyl)-N'-(2'-carboxy 4'-sulphophenyl)-ms-phenylformazan | Blue |
| 55 | disodium salt of 3,10-di-(2'-aminoethylamino) 6,13-dichlorotriphendioxazine-4,11-disulphonic acid | " |
| 56 | trisodium salt of 1-hydroxy-2-(1'-sulphonaphth-2-ylazo-8-(3'''-aminobenzoylamino)naphthalene-3,6 | Red |

| I | II | III |
|---|---|---|
| | disulphonic acid | |
| 57 | trisodium salt of 1-hydrox-2-(1',5'-disulpho-naphthyl-2"-ylazo)-8-(3"-aminobenzoylamino)naphthalene-3,6-disulphonic acid | " |

EXAMPLE 58

3.6 Parts of the condensation product obtained by the reaction of 2:4:5-trifluoro-3-cyano-5-chloropyridine with 2-sulpho-5-aminoaniline is stirred in 120 parts of water and 6 parts of 2 N sodium carbonate solution and cooled to 0°–5° C. 21 Parts of 2 N hydrochloric acid is then added and the suspension is diazotised by the dropwise addition of 5.0 parts of 2 N sodium nitrite solution. the diazo suspension is then added portionwise to a solution of 4.05 parts of the disodium salt of 1-hydroxy-8-acetylaminonaphthalene-3:6-disulphonic acid in 75 parts of water maintaining the pH at 6.5–7.0 by sodium carbonate additions and the temperature below 5° C. After stirring for 4 hours the product is salted out by the addition of 10% (w/v) salt collected by filtration and dried in vacuo at 20° C.

The product is a red dyestuff which dyes cotton at 35°–40° C. an attractive yellowish-red shade with excellent fastness properties.

The condensation of 2:4:6-trifluoro-3-cyano-5-chloropyridine with 2-sulpho-5-aminoaniline is conducted as follows:

9.4 Parts of 2-sulpho-5-aminoaniline is dissolved in 40 parts of water by the addition of sufficient 2N sodium hydroxide solution to raise the pH to 7. To this is added at 20° C. a solution of 9.6 parts of 2,4,6-trifluoro-3-cyano-5-chloropyridine in 20 parts of acetone. The pH is maintained at 5–6 by additions of sodium carbonate solution until the reaction is complete. The reaction medium is acidified with 2N hydrochloric acid, filtered and dried to give 12.6 parts of product.

The following Table gives further Examples of dyestuffs of the invention which may be obtained by replacing the 4.05 parts of the disodium salt of 1-hydroxy-8-acetylaminonaphthalene-3,6-disulphonic acid by the equivalent amount of the compound listed in Column II of the Table. Column III of the Table indicates the colour produced when the resulting dye is applied to cotton.

| I | II | III |
|---|---|---|
| 59 | disodium salt of 1-(4'-sulphophenyl)-3-carboxy-5-pyrazolone | Yellow |
| 60 | trisodium salt of 1-hydroxy-7-(4'-sulphophenyl- | Navy-blue |
| | azo)-8-aminonaphthalene-3,6-disulphonic acid | |
| 61 | disodium salt of 2-naphthol-3,6-disulphonic acid | Orange |
| 62 | disodium salt of 2-naphthylamine-5,7-disulphonic acid | " |
| 63 | monosodium salt of 2-amin-8-naphthol-6-sulphonic acid (coupling maintained at pH 4) | Red |

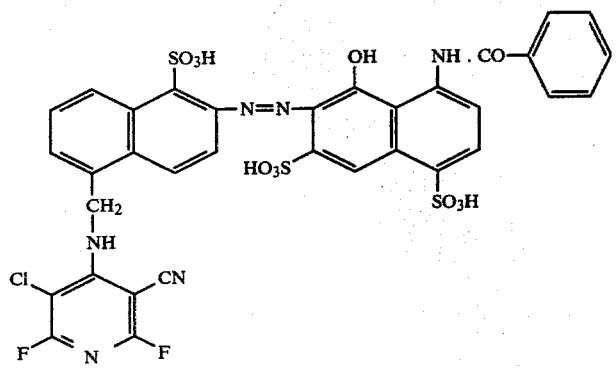

We claim:

1. A dyestuff which is capable of reacting with cellulose at 40° C. in the presence of an acid binding agent to yield a colored product with resistance to acid bleeding, said dyestuff having the formula

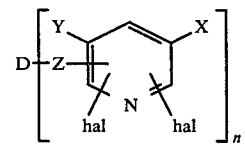

where
D is a chromophoric group
n is 1 or 2
z is

where R is H, $C_{1-4}$alkyl, $C_{1-4}$alkyl substituted by OH, $OSO_3H$, CN or $SO_3H$ or is phenyl
each hal independently represents a chlorine or fluorine atom occupying one of the remaining 2-, 4- and 6-positions of the pyridine nucleus
X is CN
Y is Cl.

2. A dyestuff as claimed in claim 1 wherein both halogens are fluorine.

3. A dyestuff as claimed in claim 1 wherein the dyestuff contains sufficient $SO_3H$ groups to have a water solubility of at least 5 grams per liter.

4. A dyestuff as claimed in claim 1 wherein Z is linked to an aromatic carbon atom in D.

5. A dyestuff as claimed in claim 1 in which D is of the form D'—Q—W' where
D' is a chromophoric group linked at an aromatic carbon atom,
Q is a direct link or $NR^3CO$ where $R^3$ is H or $C_{1-4}$alkyl, and
W' is $CH_2$ or $CH_2CH_2$.

6. A dyestuff as claimed in claim 1 of the formula: